(12) United States Patent
Wang

(10) Patent No.: US 6,971,565 B2
(45) Date of Patent: Dec. 6, 2005

(54) SECURING DEVICE FOR BICYCLE RACKS ON VEHICLES

(76) Inventor: Chiu Kuei Wang, No. 101-19, Chung-Cheng Li, Yuanli, Miaoli Hsien (TW)

(*) Notice: Subject to any disclaimer, the term of this patent is extended or adjusted under 35 U.S.C. 154(b) by 73 days.

(21) Appl. No.: 10/600,459

(22) Filed: Jun. 23, 2003

(65) Prior Publication Data

US 2004/0256429 A1   Dec. 23, 2004

(51) Int. Cl.⁷ .............................................. B60R 11/00
(52) U.S. Cl. ...................... 224/497; 224/924; 224/520; 70/233
(58) Field of Search ................ 224/497, 520, 224/924, 495; 70/233, 235

(56) References Cited

U.S. PATENT DOCUMENTS

| | | | | |
|---|---|---|---|---|
| 3,858,775 A | * | 1/1975 | Haas | 224/520 |
| D320,775 S | * | 10/1991 | Johansson | D12/408 |
| 5,121,862 A | * | 6/1992 | Schmidt | 224/520 |
| 5,228,606 A | * | 7/1993 | Hickson | 224/42.13 |
| 5,228,607 A | * | 7/1993 | Tolsdorf | 224/520 |
| 5,232,133 A | * | 8/1993 | Speer | 224/485 |
| 5,285,937 A | * | 2/1994 | Schmidt | 224/520 |
| 5,388,736 A | * | 2/1995 | Schmidt | 224/520 |
| 5,579,974 A | * | 12/1996 | Schmidt | 224/520 |
| 5,588,574 A | * | 12/1996 | Schmidt | 224/520 |
| 5,950,892 A | * | 9/1999 | Tsai | 224/520 |
| 6,234,372 B1 | * | 5/2001 | Rivera | 224/536 |
| 6,644,525 B1 | * | 11/2003 | Allen et al. | 224/497 |

* cited by examiner

Primary Examiner—Tri M. Mai
(74) Attorney, Agent, or Firm—Rosenberg, Klein & Lee (57) ABSTRACT

A bicycle rack includes two rods with two plates pivotably connected therebetween and a secure device is connects the two plates. The secure device includes a locking member with a latch which extends through the body of the secure device and is engaged with two aligned apertures respectively defined through the two plates. The locking member is controlled by a lock device so that the latch is not disengaged form the apertures of the plates unintentionally. An operation member is connected to one of the two rods and a locking ring is connected to the other rod so as to be hooked on the operation member to clamp the two clamping members together to securely clamp the spherical receiver between the clamping members.

6 Claims, 15 Drawing Sheets

SECURING DEVICE FOR BICYCLE RACKS ON VEHICLES

FIELD OF THE INVENTION

The present invention relates to a bicycle rack which is connected to a vehicle and the bicycle rack is easily and securely to be connected to the receiver on the bicycles.

BACKGROUND OF THE INVENTION

A conventional bicycle rack connected on a car generally includes two rods and each of which has a clamping member on a lower end thereof so as to clamp a spherical receiver connected to the car. Two stretch plates are respectively pivotally connected to the two rods so as to stretch the two rods outward. When the two rods are stretched outward, the clamping members on the lower ends of the rods clamp the spherical receiver on the car. The two stretch plates are connected to the two rods by pins which could fold and the whole rack is loosened. The bicycles secured on the loosened bicycle rack shake if the rack is loosened and even fall down from the bicycle rack.

Figure 1:
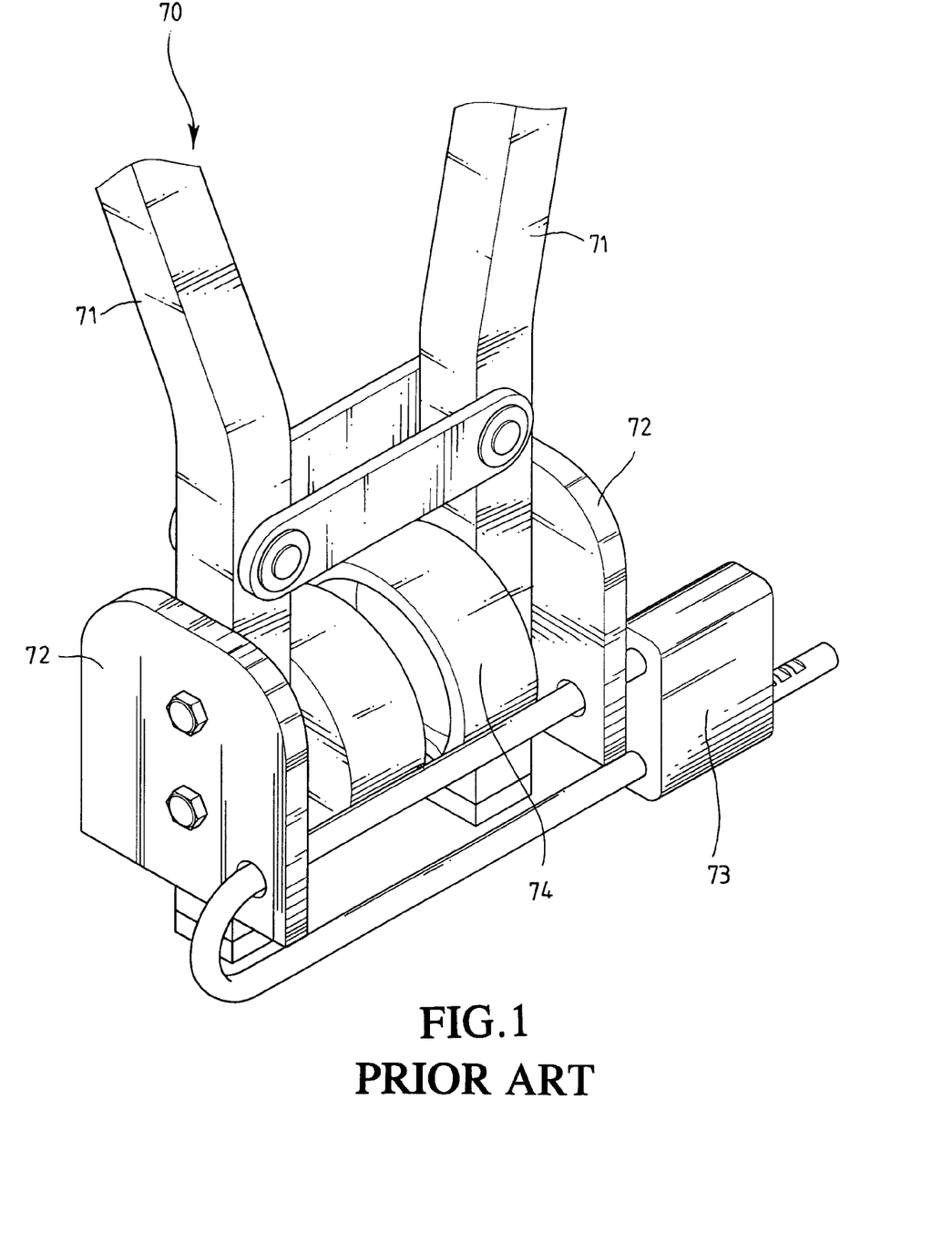
FIG. 1 shows a conventional structure to prevent two clamping members from being separated from each other.
Figure 2:
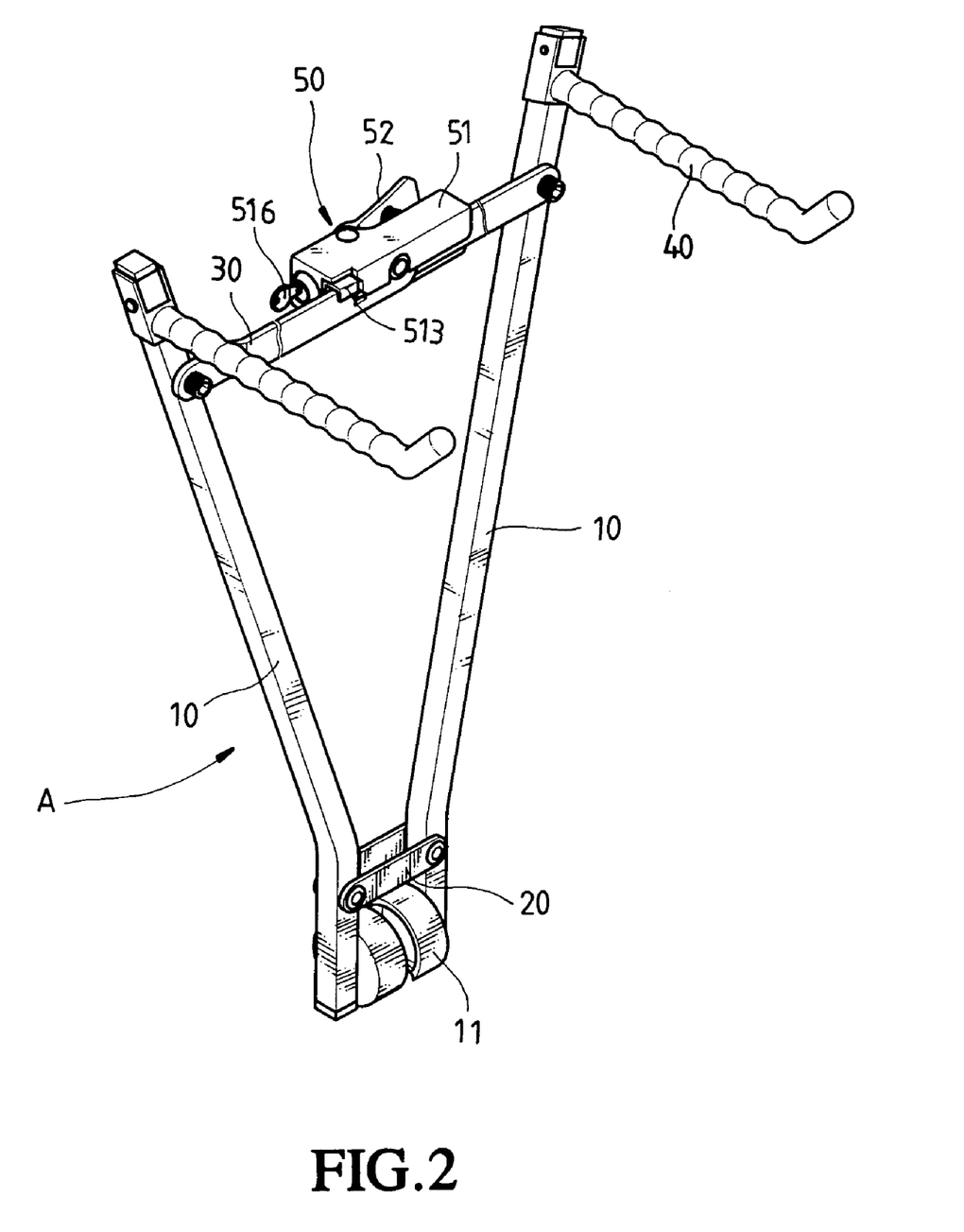
FIG. 2 is a perspective view to show the bicycle rack with a secure device of the present invention.
Figure 3:
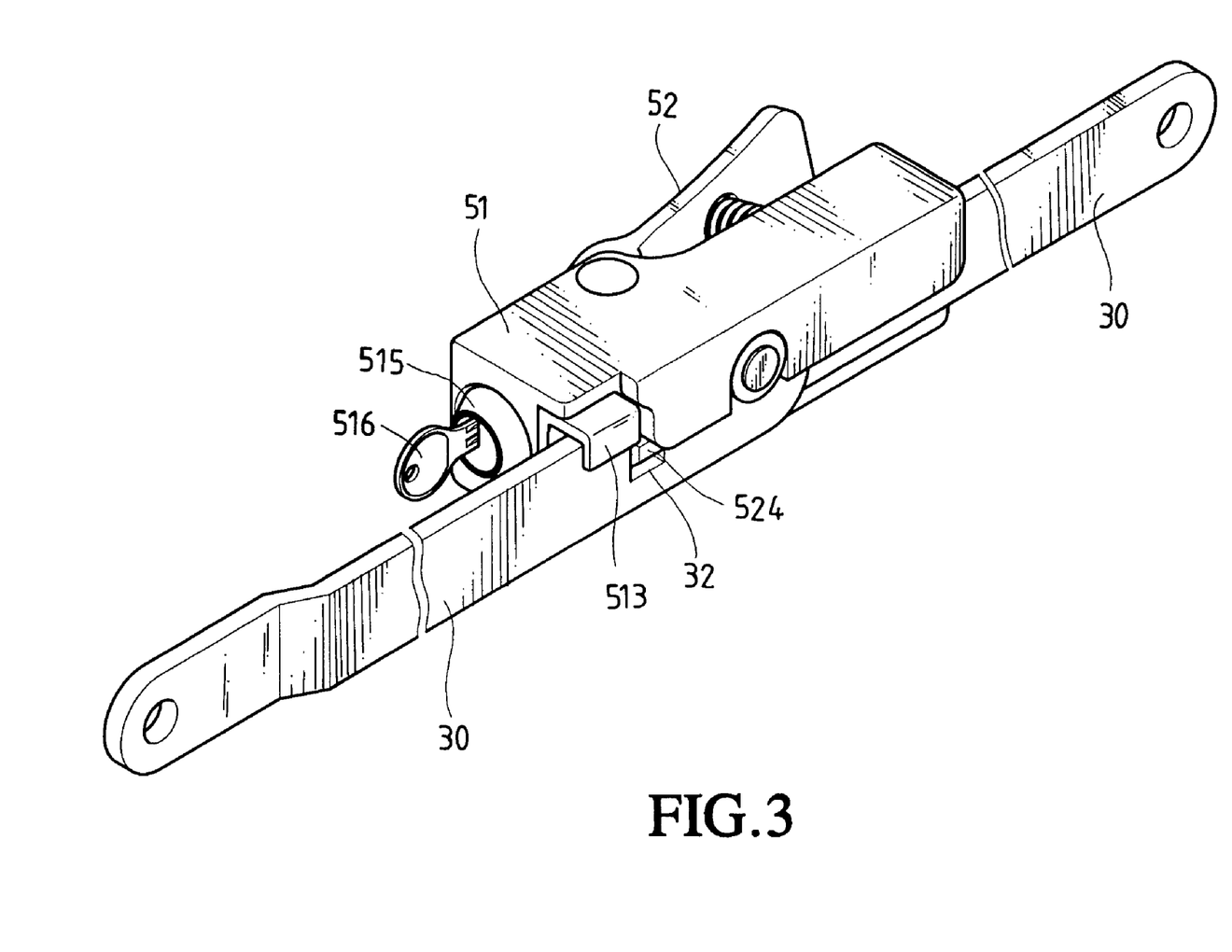
FIG. 3 is a perspective view to show the secure device of the present invention.
Figure 4:
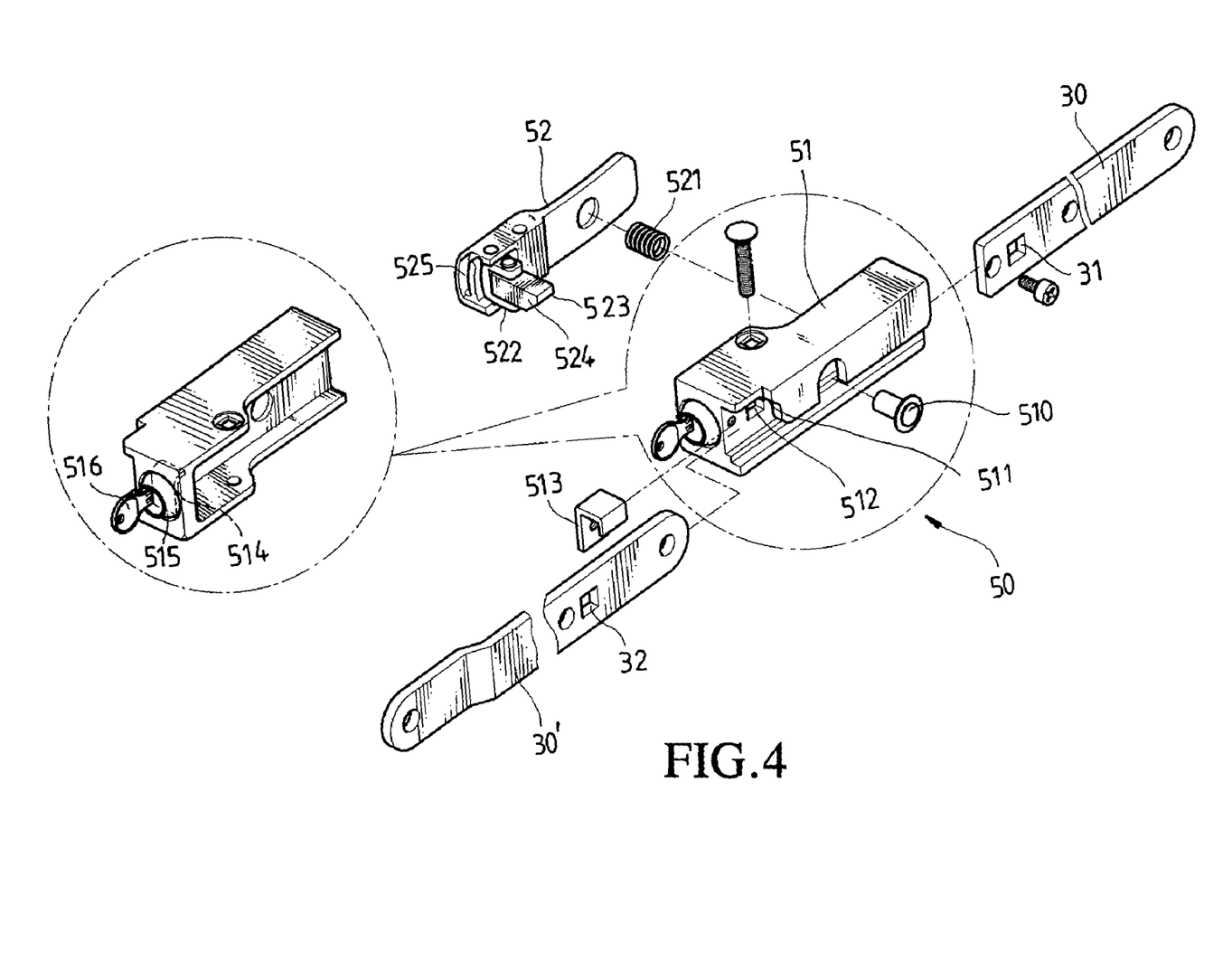
FIG. 4 is an exploded view to show the secure device of the present invention.
Figure 5:
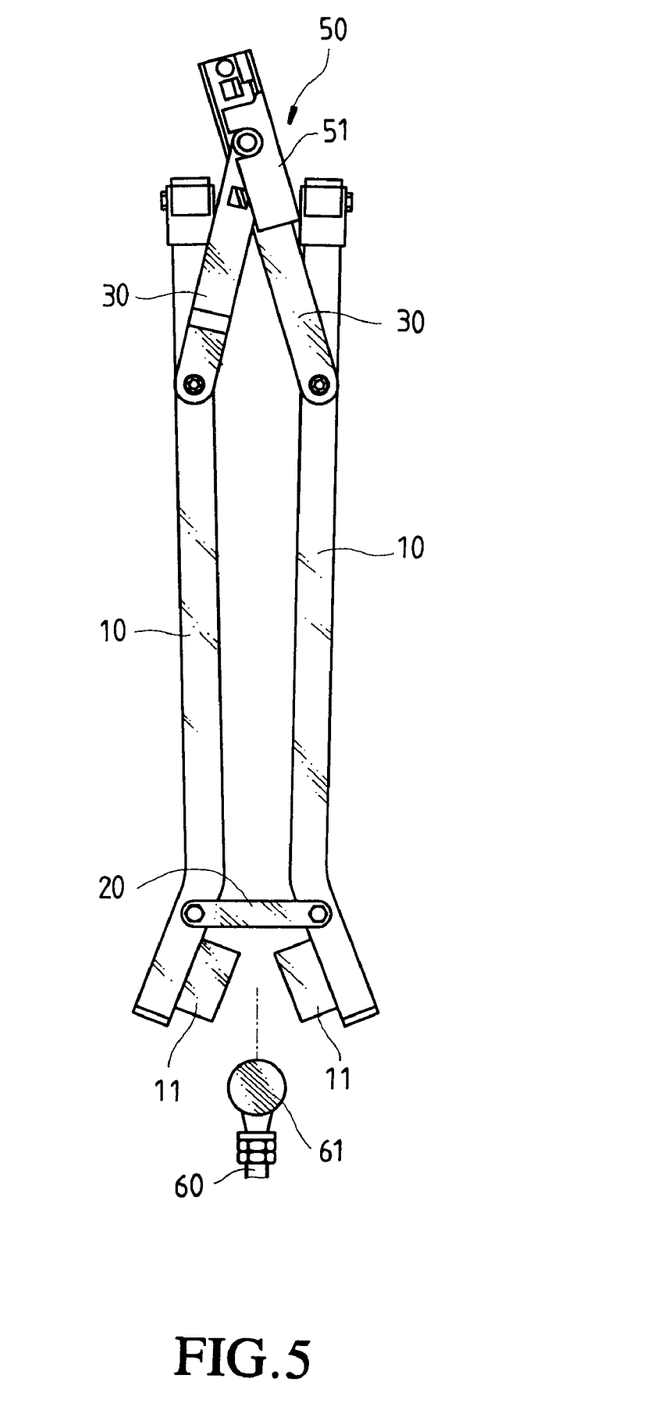
FIG. 5 shows the secure device is in an unlocked status.
Figure 6:
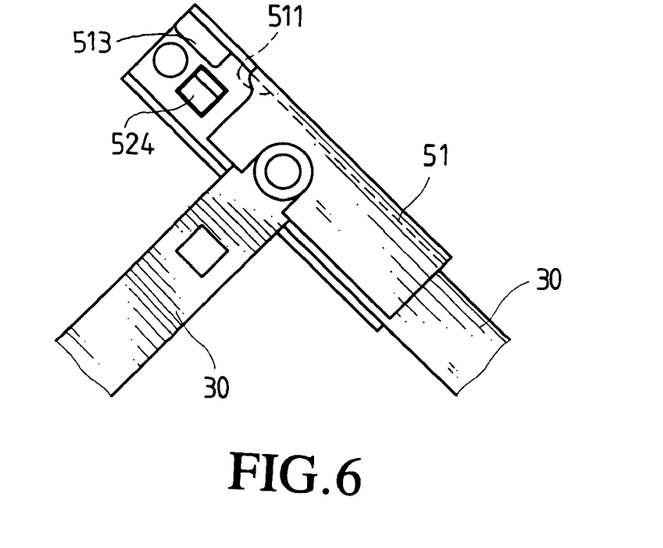
FIGS. 6 to 8 show the actions that the secure device connects the two plates between the two rods of the bicycle rack of the present invention.
Figure 7:
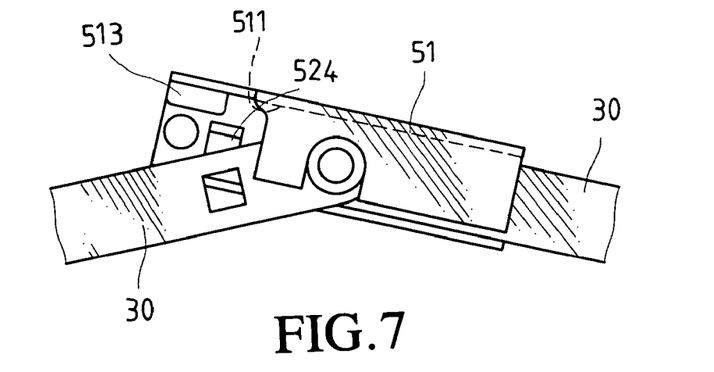

Besides, as shown in FIG. 1, in order to maintain the two clamping members 74 at their positions and prevent the two clamping members 74 from being separated from each other, two boards 72 are fixed to the two rods 71 and a lock 73 connects the two boards 72 together so as to restrain the relative position of the two clamping members 72. This lock 73 and two boards 72 are additional parts which increase installation time and the lock 73 has to be stored carefully when it is not in use.

The present invention intends to provide a bicycle rack that has a secure device for positioning the two stretch plates and another secure device for tightly gathering the two clamping members.

SUMMARY OF THE INVENTION

In accordance with one aspect of the present invention, there is provided a bicycle rack which comprises two rods each have a rack connected to a first end thereof and a clamping member connected to a second end thereof. Two positioning plates are pivotably connected to the two rods and located close to the two clamping members. A first plate and a second plate are respectively connected to the two rods and located close to the two racks. A secure device connects the first plate and the second plate. The secure device includes a body, the first plate and the second plate are pivotally connected at a common point on a first side of the body. A locking member is connected to a second side of the body and has a latch which extends through a passage in the body and is engaged with two respective apertures defined through the first plate and the second plate. A lock device is connected to an end of the body and includes a locking piece which is removably engaged with the locking member to prevent the latch from being removed from the two apertures.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 2 to 5 and 18, the bicycle rack "A" of the present invention is connected to a back of a car and comprises two rods 10 each have a rack 40 connected to a first end thereof so as to support bicycles (not shown) thereon and a clamping member 11 is connected to a second end of each of the two rods 10. The two clamping members 11 face each other and clamp a spherical receiver 61 on a frame 60 fixed to the car. Two positioning plates 20 are pivotably connected to the two rods 10 and located close to the two clamping members 11.

Figure 8:
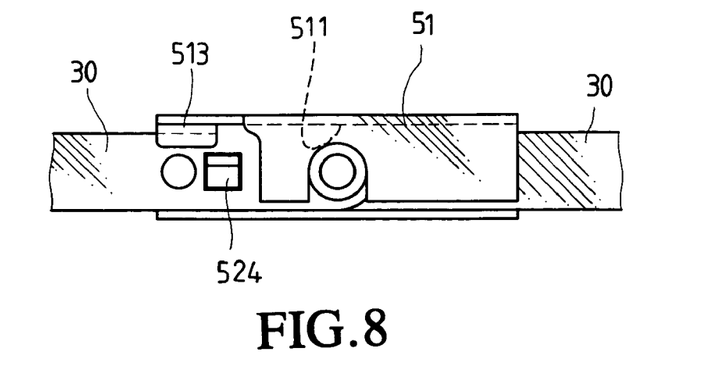

A first plate 30 and a second plate 30' are respectively connected to the two rods 10 and located close to the two racks 40. A secure device 50 connects the first plate 30 and the second plate 30' together. The secure device 50 includes a body 51 and the first plate 30 and the second plate 30' are pivotally connected at a common point on a first side of the body 51 by a rivet 510. A tunnel 511 is defined in the first side of the body 51 so that the first plate 30 is restrained in the tunnel 511 and the second plate 30' is able to be pivoted about the rivet 510 at an angle relative to the body 51. Each of the first plate 30 and the second plate 30' has an aperture 31/32 and the two apertures 31, 32 are located in alignment with each other when the two plates 30, 30' are positioned in horizontal directly as shown in FIG. 8. A stop member 513 is connected to the first side of the body 51 so as to stop the second plate 30' from being over pivoted.

A locking member 52 is pivotably connected to a second side of the body 51 at a mediate portion of the locking member 52. A latch 524 is connected to a side at a first end of the locking member 52 and a spring 521 is biased between the second end of the locking member 52 and the second side of the body 51. The latch 524 is connected to a U-shaped frame 522 and has an inclined surface 523. A passage 512 is defined through the body 51 and located in alignment with the two apertures 31, 32 defined through the first plate 30 and the second plate 30'. The latch 524 extends through the passage 512 and the two apertures 31, 32 when the two plates 30, 30' are positioned in horizontal directly as shown in FIG. 8. The inclined surface 523 allow the first end of the locking member 52 to be pushed outward when a top edge of the second plate 30' pushes the inclined surface 523 when pivoting the second plate 30'.

Figure 9:
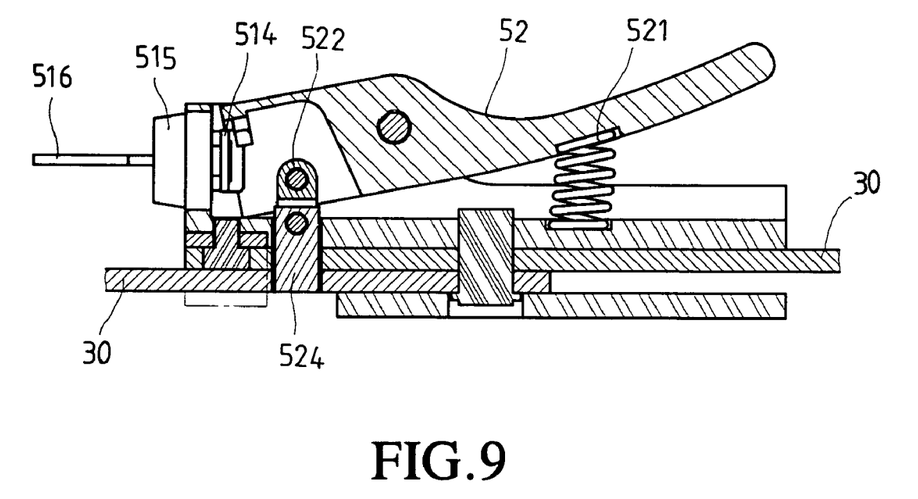
FIG. 9 is a cross sectional view to show the locking member is in an unlock status.
Figure 10:
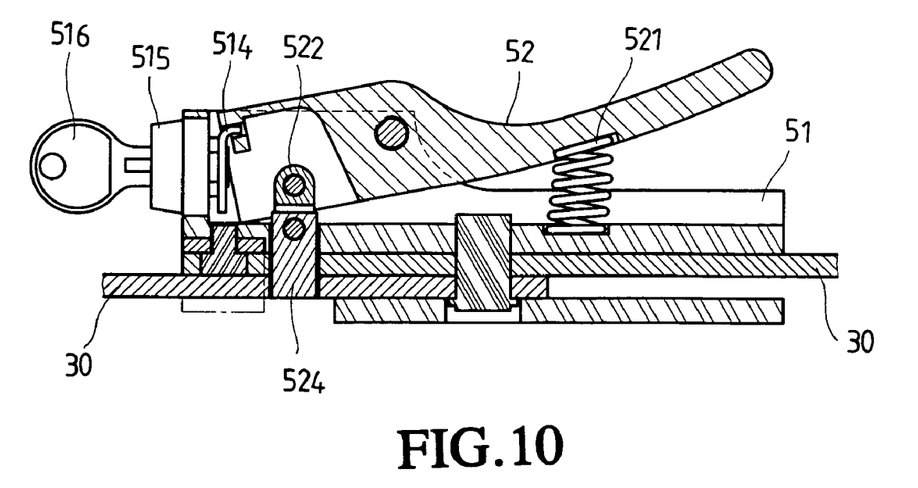
FIG. 10 is a cross sectional view to show the locking member is in an locked status.
Figure 11:
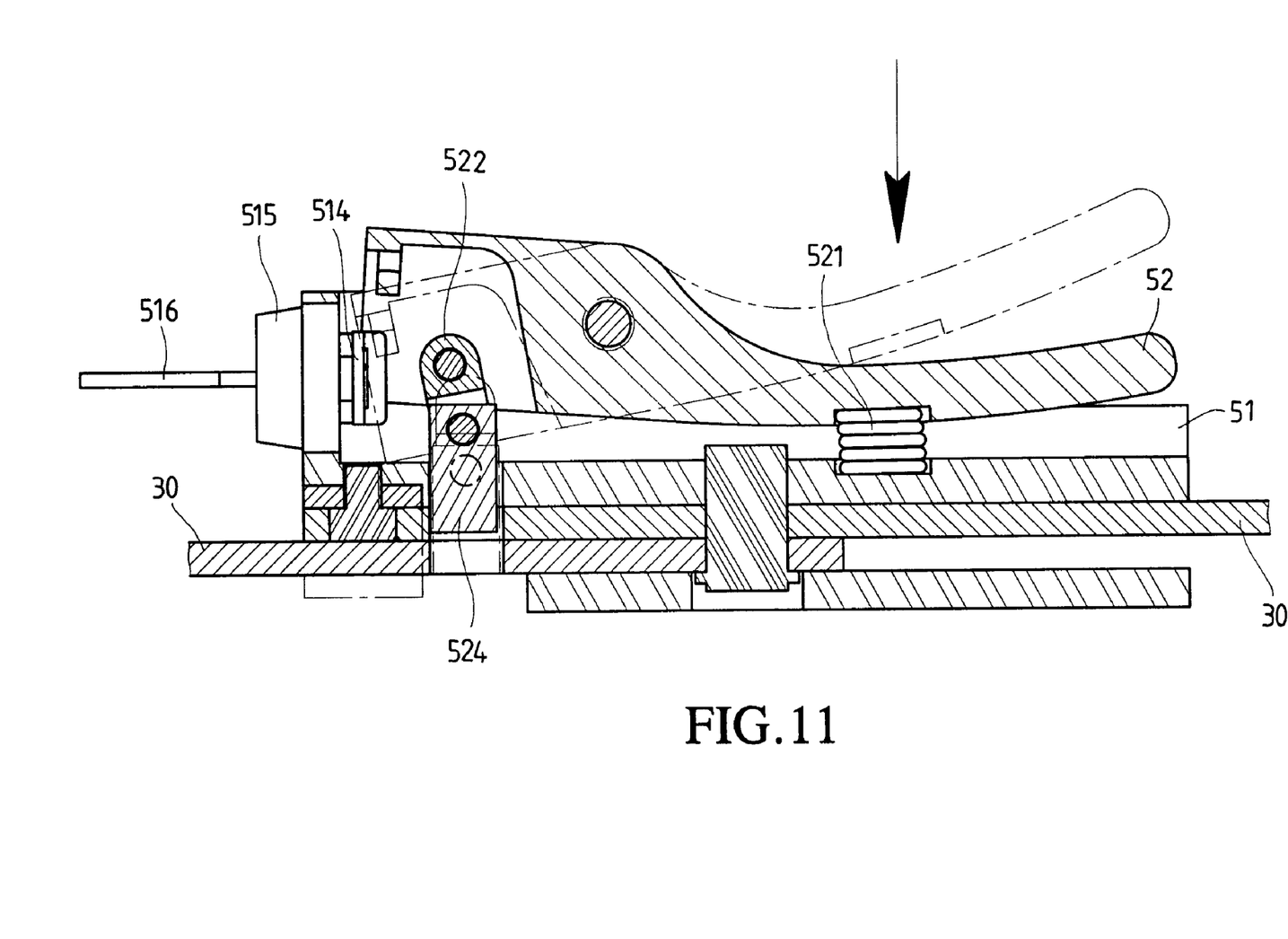
FIG. 11 shows the locking member is pushed to remove the latch from the apertures in the plates.

Further referring to FIGS. 9 to 11, a lock device 515 is connected to an end of the body 51 and includes a locking piece 514 which is removably engaged with a notch 525 defined in the first end of the locking member 52. The locking member 52 can be operated by using a key 516 which rotates the locking piece 514 so as to prevent the latch 524 from being removed from the two apertures 31, 32 if the locking member 52 is unintentionally pushed. When rotating the key 516 to set the secure device 50 in an unlock status as shown in FIG. 9, the locking member 52 is able to be pushed at the second end thereof and remove the latch 524 from the apertures 31, 32.

Referring to FIGS. 2, and 5 to 8, the two rods 10 can be stretched outward by pivoting the two plates 30, 30 to horizontal positions and the latch 524 is engaged with the two apertures 31, 32, and the second plate 30' is stopped by the stop member 513.

Figure 12:
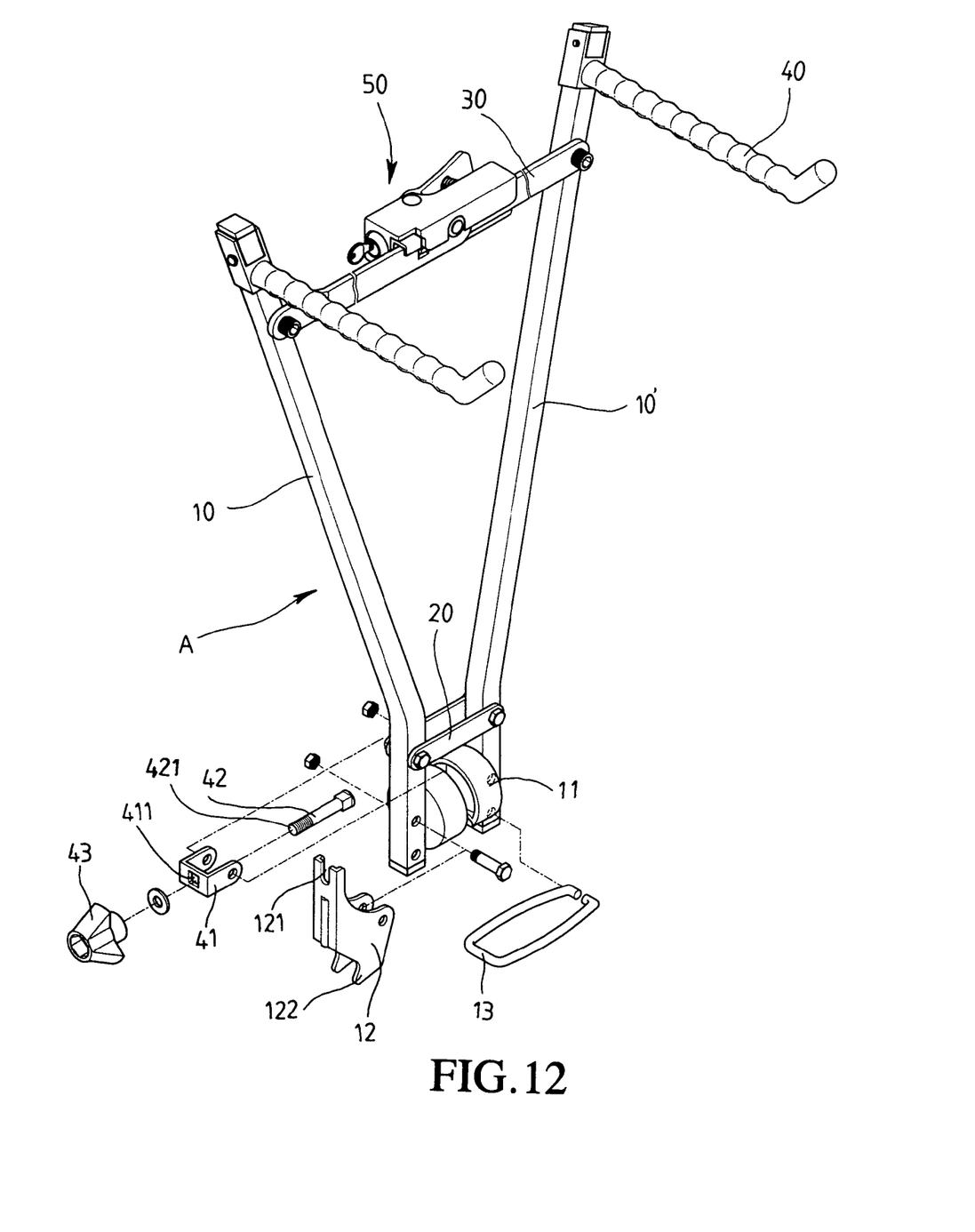
FIG. 12 shows the other secure device for pulling the two clamping members together.
Figure 13:
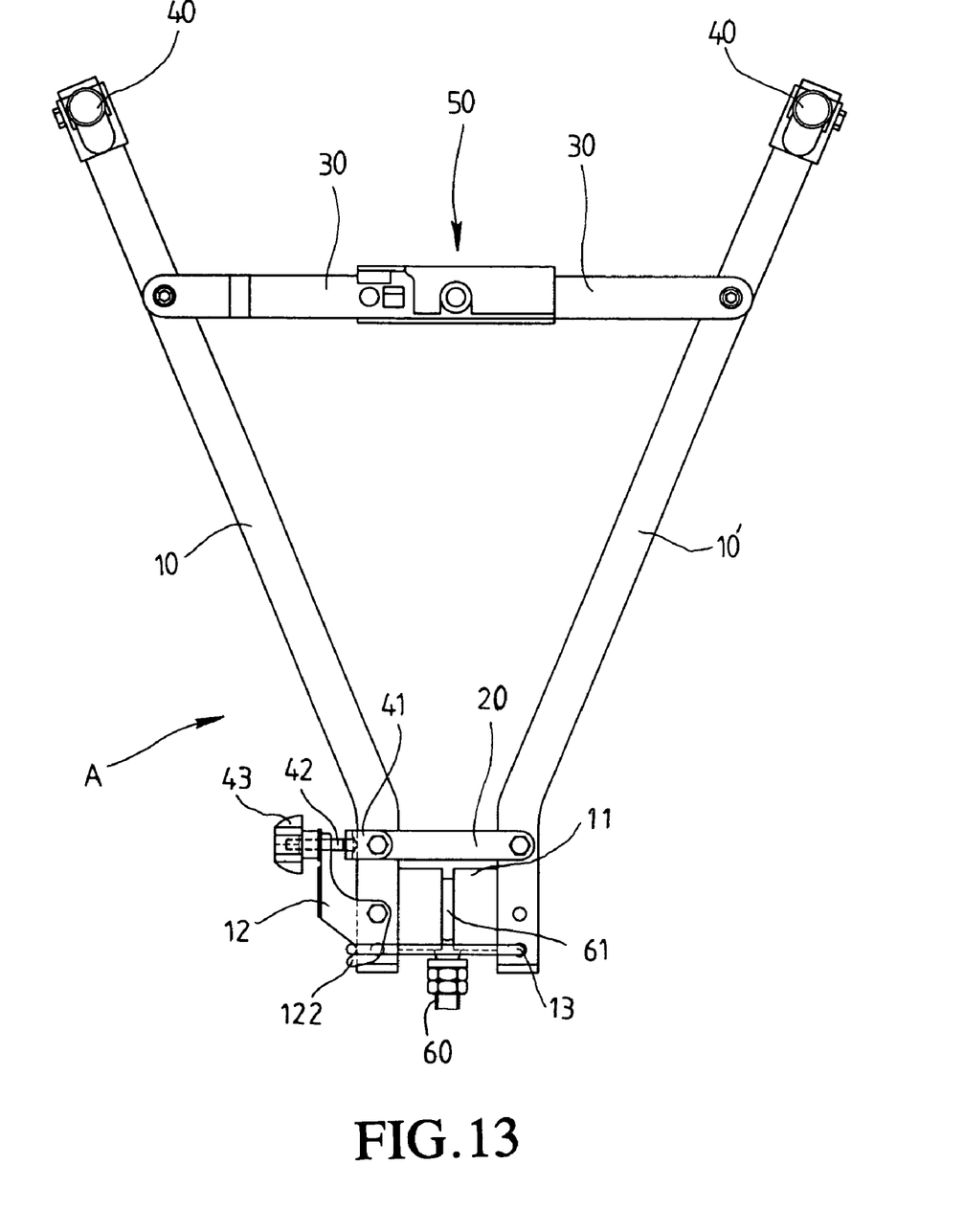
FIG. 13 shows a front side view of the bicycle rack with the two secure devices.

Referring to FIGS. 12 and 13, another secure device is used to securely pull the two clamping members 11 together and the secure device comprises an operation member 12 pivotably connected to the first rod 10 and a hook portion 122 is on a first end of the operation member 12. A recess 121 is defined in a second end of the operation member 12. A U-shaped frame 41 connected to two opposite sides of the first rod 10 and a bolt 42 extends through a hole 411 in the frame 41 from an inner side of the frame 41. A knob 43 is threadedly connected to a threaded section the bolt 42. The bolt 42 is removably engaged with the recess 121 in the operation member 12. A locking ring 13 is pivotally connected to the second rod 10' and disengagably hooked to the hook portion 122.

Figure 14:
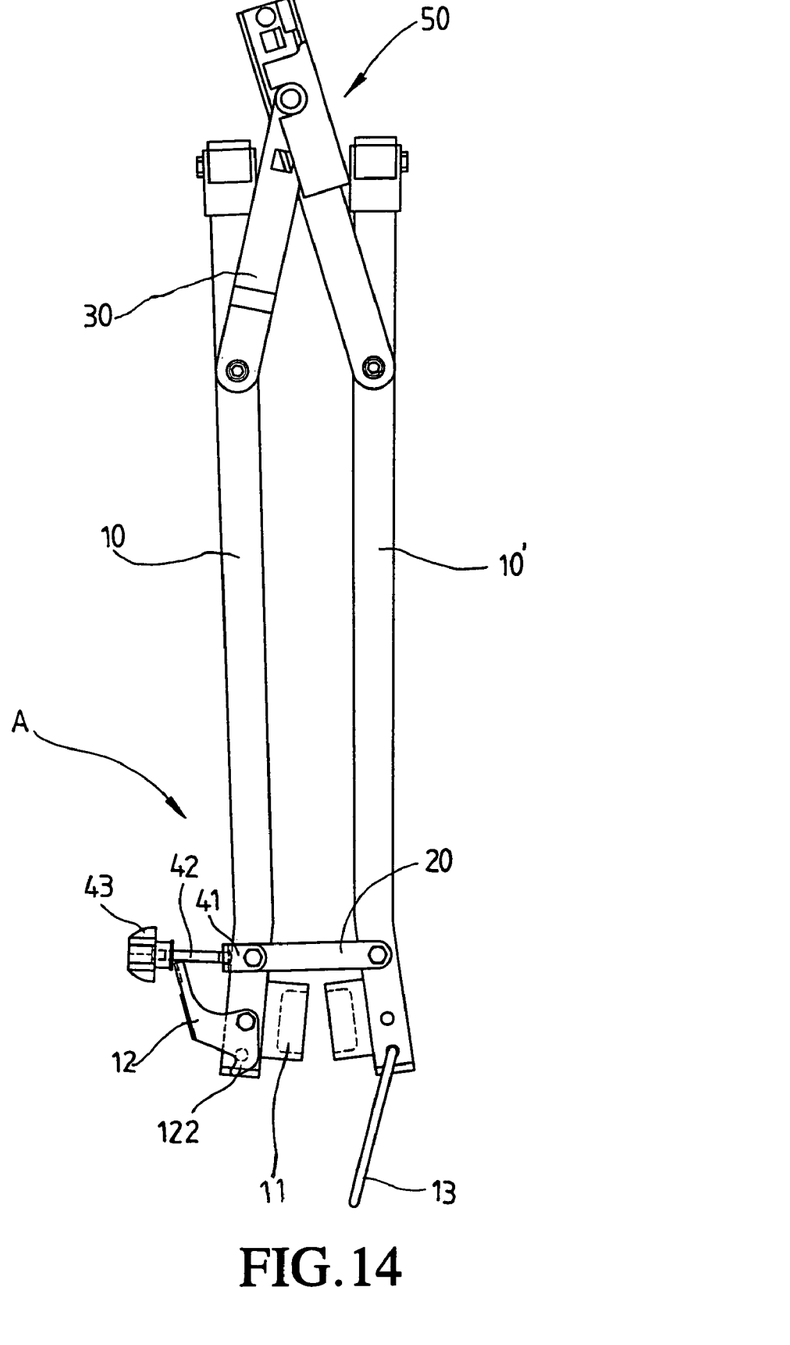
FIG. 14 shows the bolt is not yet engaged with the recess of the operation member.
Figure 15:
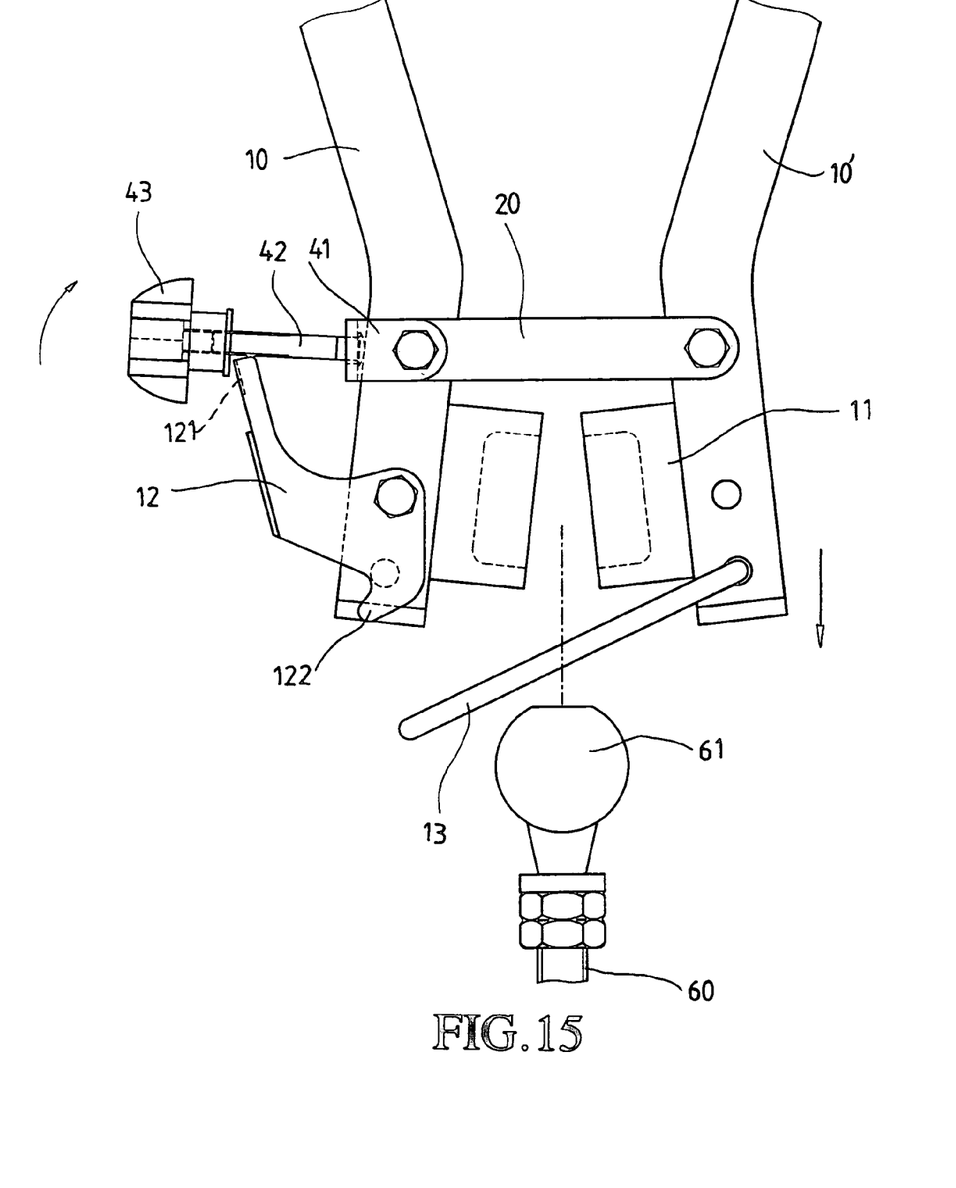
FIG. 15 shows the locking ring is disengaged from the hook portion of the operation member.
Figure 16:
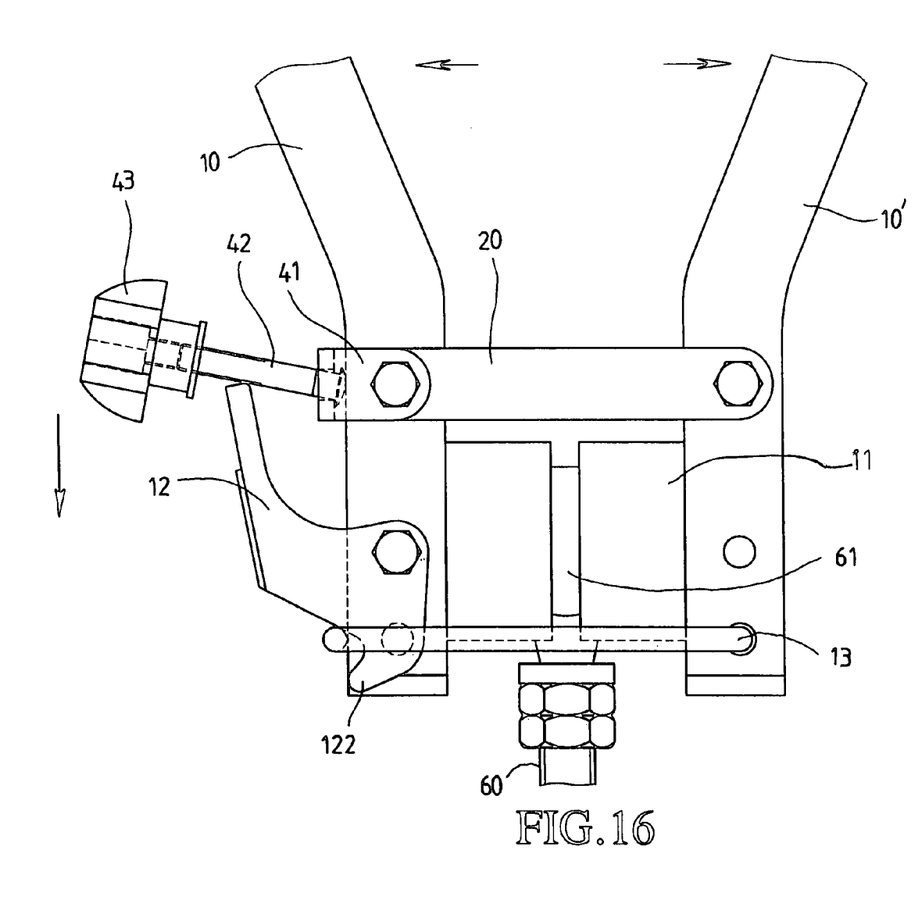
FIG. 16 shows the locking ring is engaged from the hook portion of the operation member.
Figure 17:
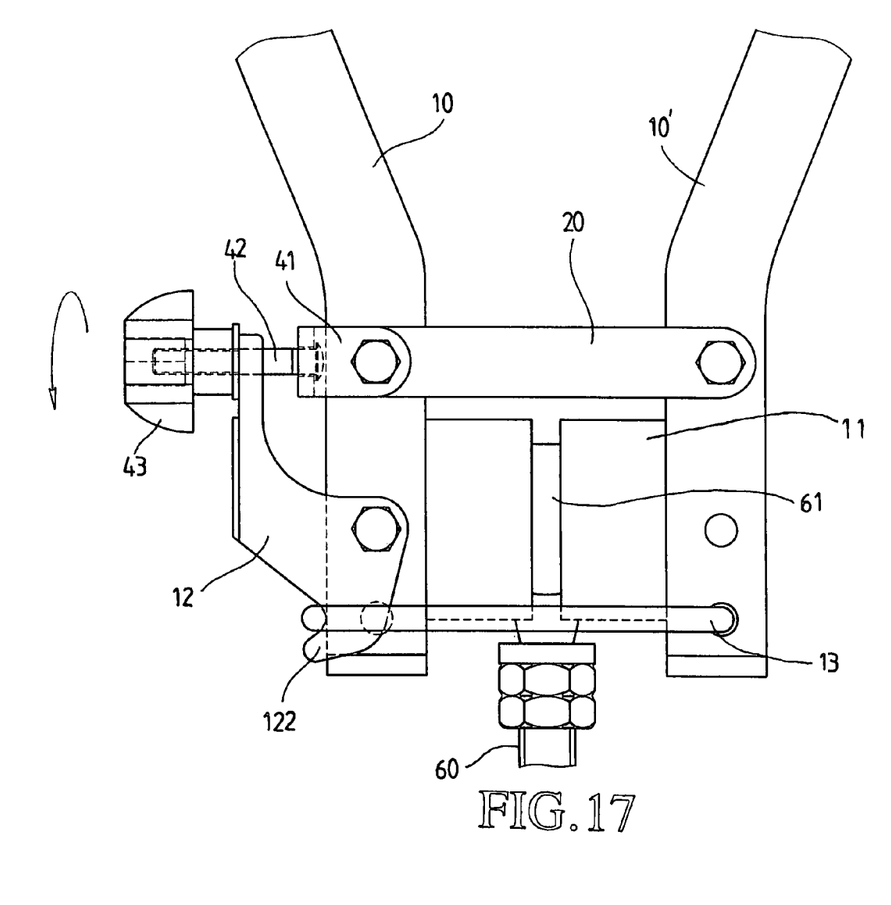
FIG. 17 shows the hook portion of the operation member pulls the locking ring by rotating the knob.
Figure 18:
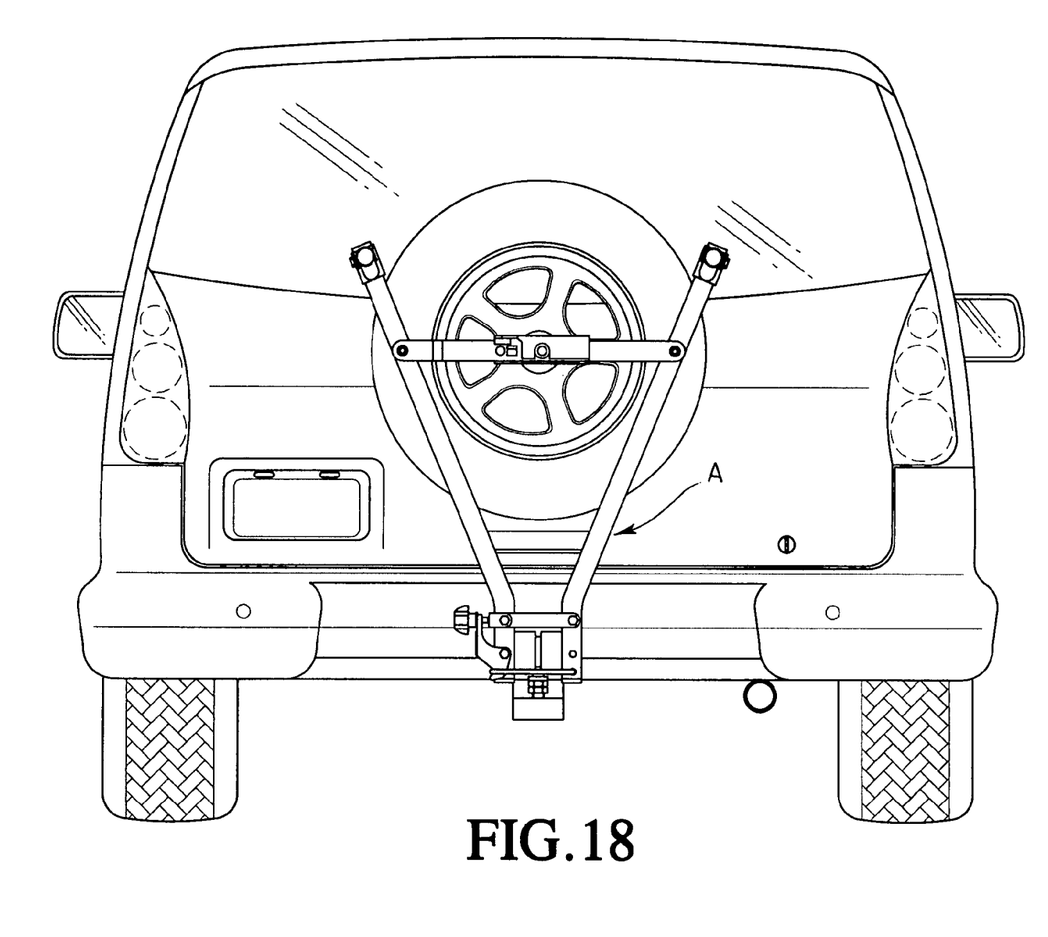
FIG. 18 shows the bicycle rack is connected to a back of a car.

Referring to FIGS. 14 and 16, when stretching the two rods 10, 10' outward, the locking ring 13 is engaged with the hook portion 122 of the operation member 12 and the bolt 42 is engaged with the recess 121 of the operation member 12. Rotating the knob 43 as shown in FIG. 17, the hook portion 122 is pivoted outward to securely pull the locking ring 13 so that the two clamping members 11 are pulled together. As shown in FIG. 15, when unlocking the secure device, the knob 43 is unscrewed and the hook portion 122 is able to be pivoted so as to allow the locking ring 13 to be disengaged from the hook portion 122.

While we have shown and described the embodiment in accordance with the present invention, it should be clear to those skilled in the art that further embodiments may be made without departing from the scope of the present invention.

What is claimed is:

1. A bicycle rack comprising:
    two rods each having a rack connected to a first end thereof and a clamping member connected to a second end of each of the two rods, the two clamping members facing each other, two positioning plates pivotally connected to the two rods and located close to the two clamping members;
    a first plate and a second plate respectively connected to the two rods and located close to the two racks, a secure device connecting the first plate and the second plate together, the secure device including a body and the first plate and the second plate are pivotally connected at a common point on a first side of the body, a locking member connected to a second side of the body and having a latch pivotally connected to and extending from a side thereof, a passage defined through the body and located in alignment with two respective apertures which are respectively defined through the first plate and the second plate, the latch extending through the passage and the two apertures, the locking member having a notch formed in the first end thereof; and
    a lock device connected to an end of the body and including a locking piece which is removably and rotatably engaged with the notch of the locking member to prevent the latch from being removed from the two apertures, the latch of the locking member being disengageable from the apertures of the first plate and the second plate when the locking piece of lock device is disengaged from the notch of the locking member.

2. The rack as claimed in claim 1, wherein a tunnel is defined in the first side of the body so that the first plate is restrained in the tunnel.

3. The rack as claimed in claim 1, wherein the locking member is pivotably connected to the body at a mediate portion of the locking member, the latch connected to a first end of the locking member and a spring biased between the second end of the locking member and the second side of the body.

4. The rack as claimed in claim 1 further comprising a stop member connected to the first side of the body so as to stop the second plate from being over pivoted.

5. The rack as claimed in claim 1, wherein the latch includes an inclined surface which faces a top edge of the second plate.

6. A bicycle rack comprising:
    a first rod and a second rod each having a rack connected to a first end thereof and a clamping member connected to a second end of each of the first rods and the second rod, the two clamping members facing each other, two stretch plates pivotally connected between the two rods, two positioning plates pivotably connected to the two rods and located close to the two clamping members;
    an operation member pivotably connected to the first rod and a hook portion on a first end of the operation member, a recess defined in a second end of the operation member, a U-shaped frame connected to two opposite sides of the first rod and a bolt extending through the frame and a knob threadedly connected to the bolt, the bolt being removably engaged with the recess in the operation member; and
    a locking ring pivotably connected to the second rod adjacent to the two clamping members and spaced from the two positioning plates with the clamping members disposed therebetween, the locking ring being disengagably hooked to the hook portion of the operation member.

* * * * *